Dec. 28, 1943.  R. M. MERO  2,338,002
MACHINE FOR WELDING KEYS TO CAN ENDS
Filed Dec. 18, 1942  8 Sheets-Sheet 1

Inventor
Ralph M. Mero
By Mason, Porter & Diller
Attorneys

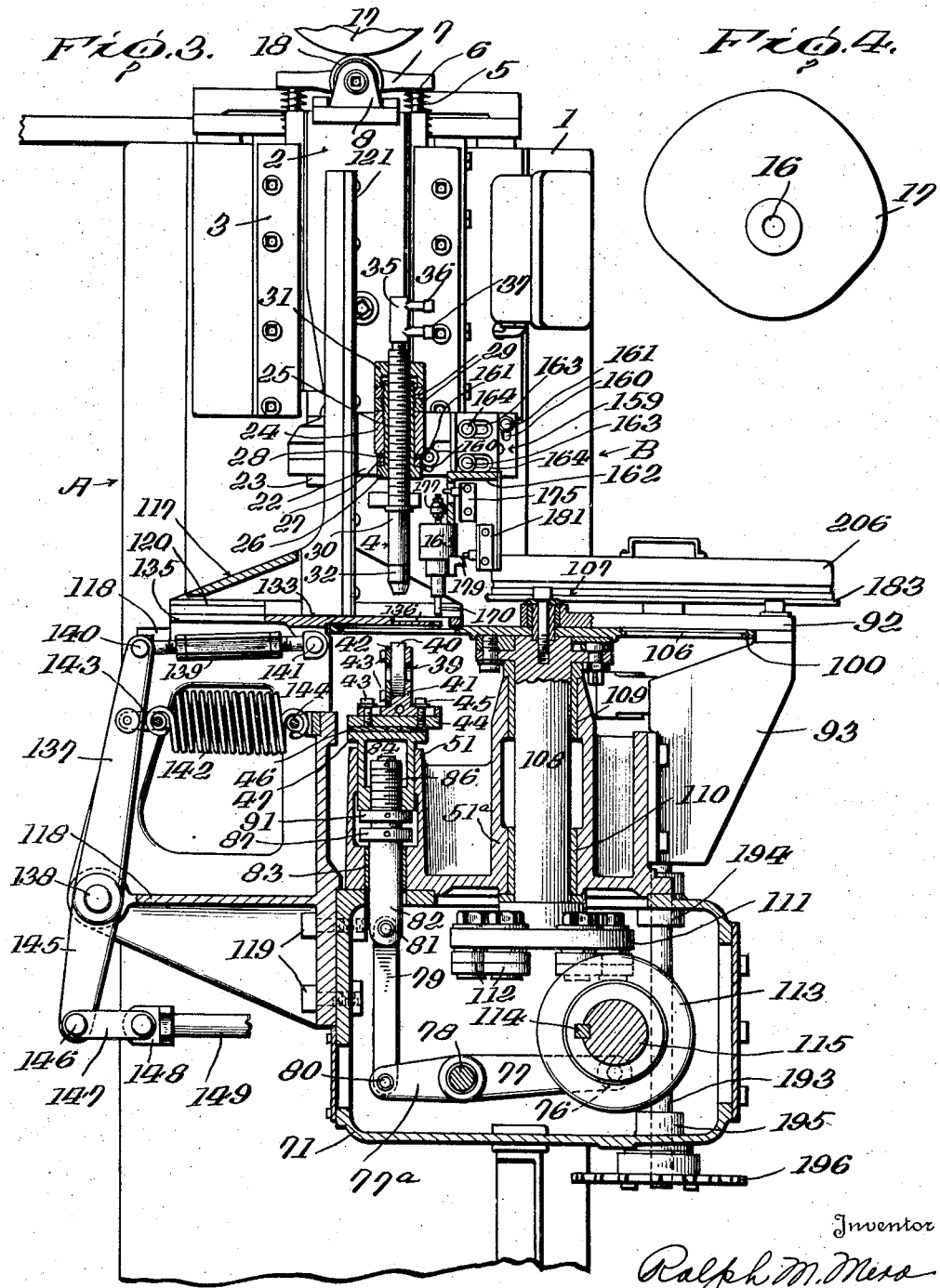

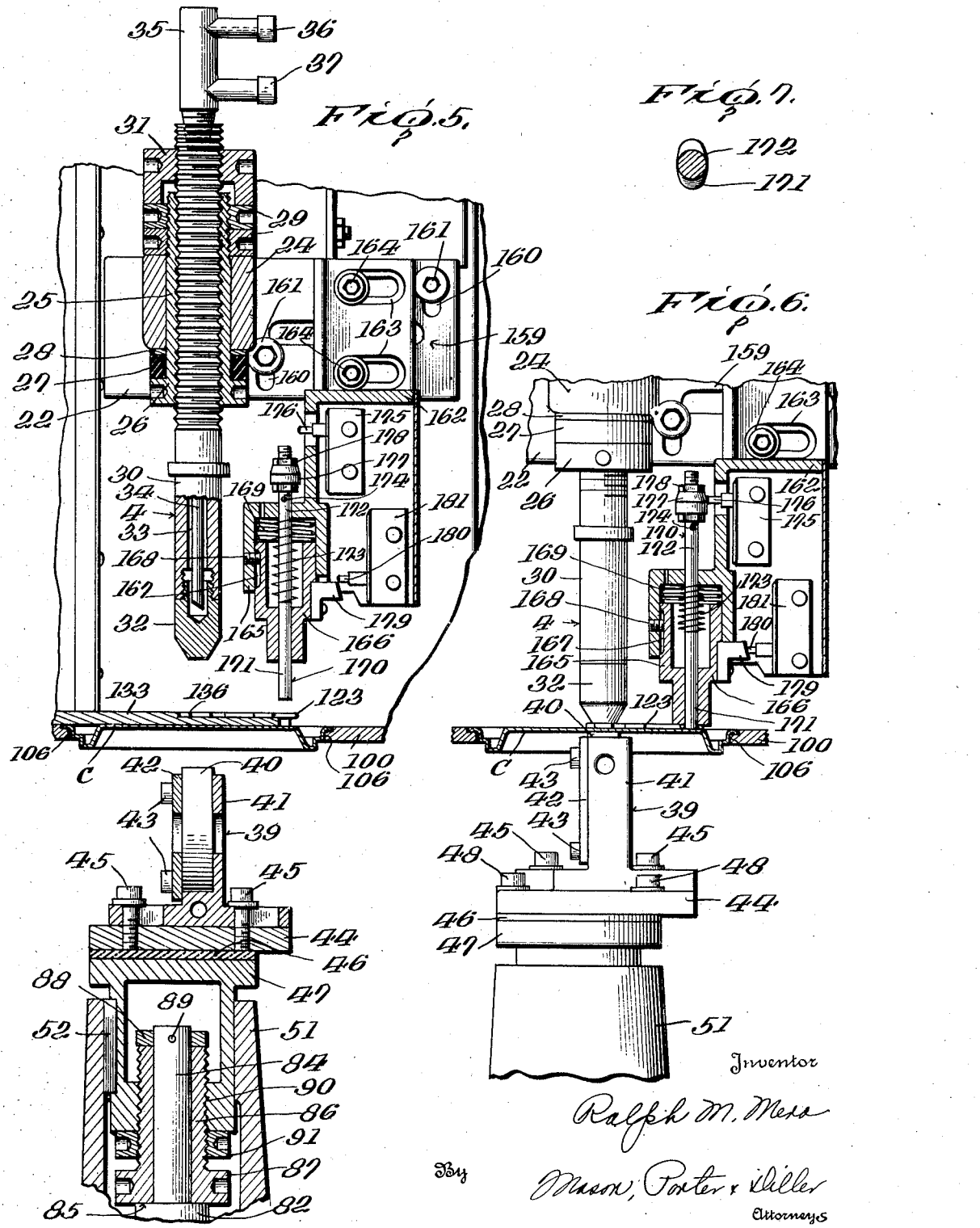

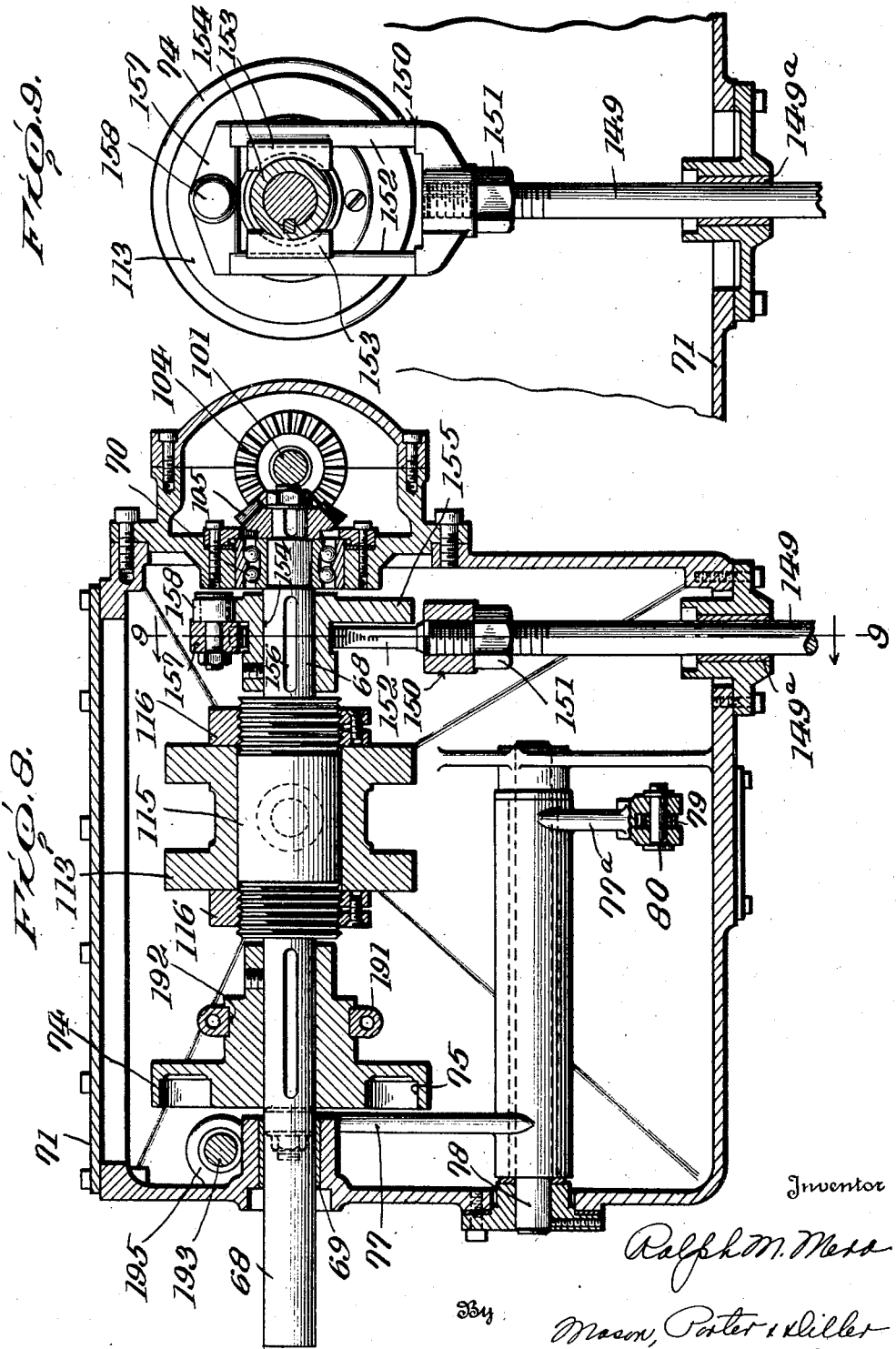

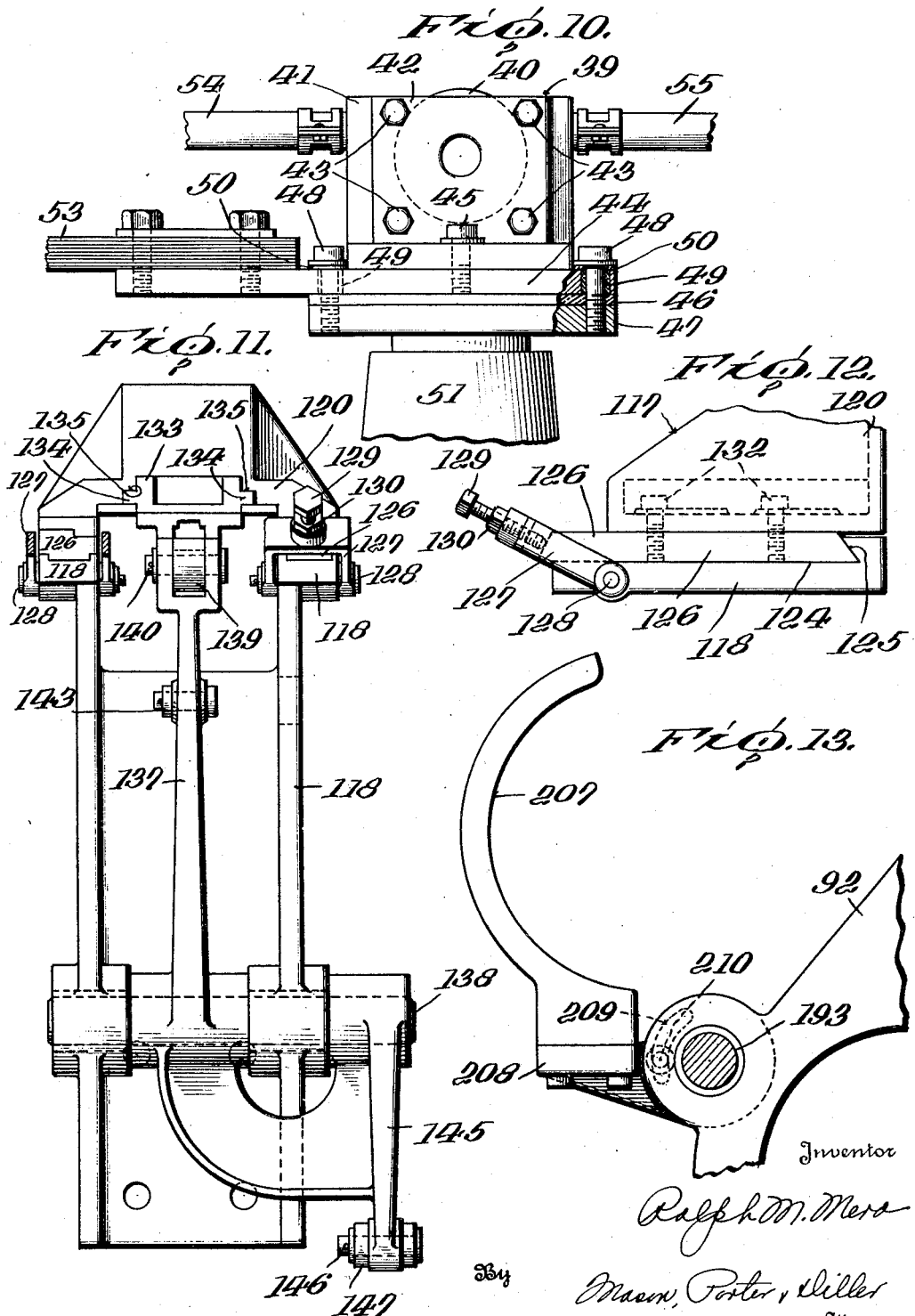

Dec. 28, 1943.　　　　R. M. MERO　　　　2,338,002
MACHINE FOR WELDING KEYS TO CAN ENDS
Filed Dec. 18, 1942　　　　8 Sheets-Sheet 7
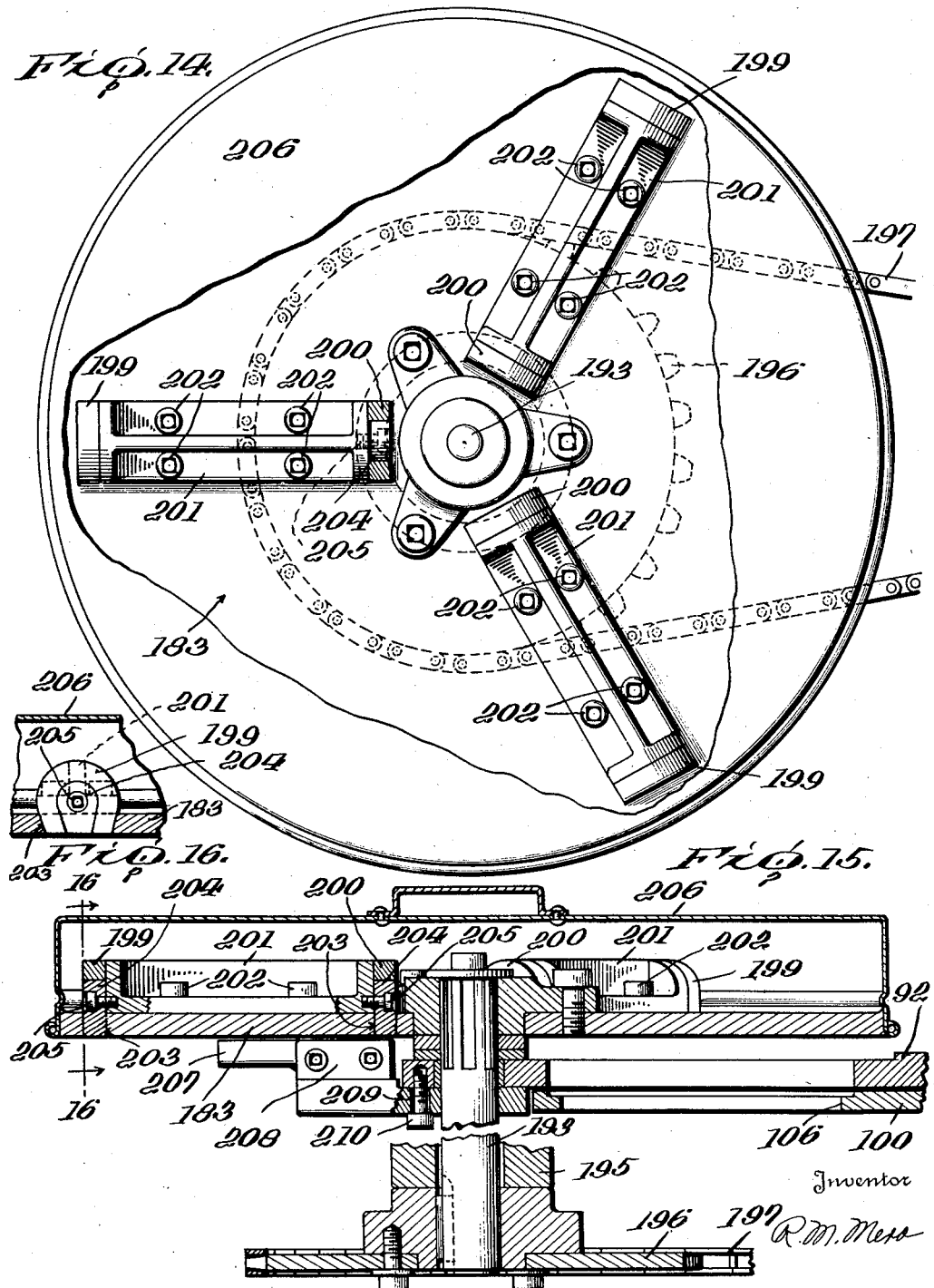

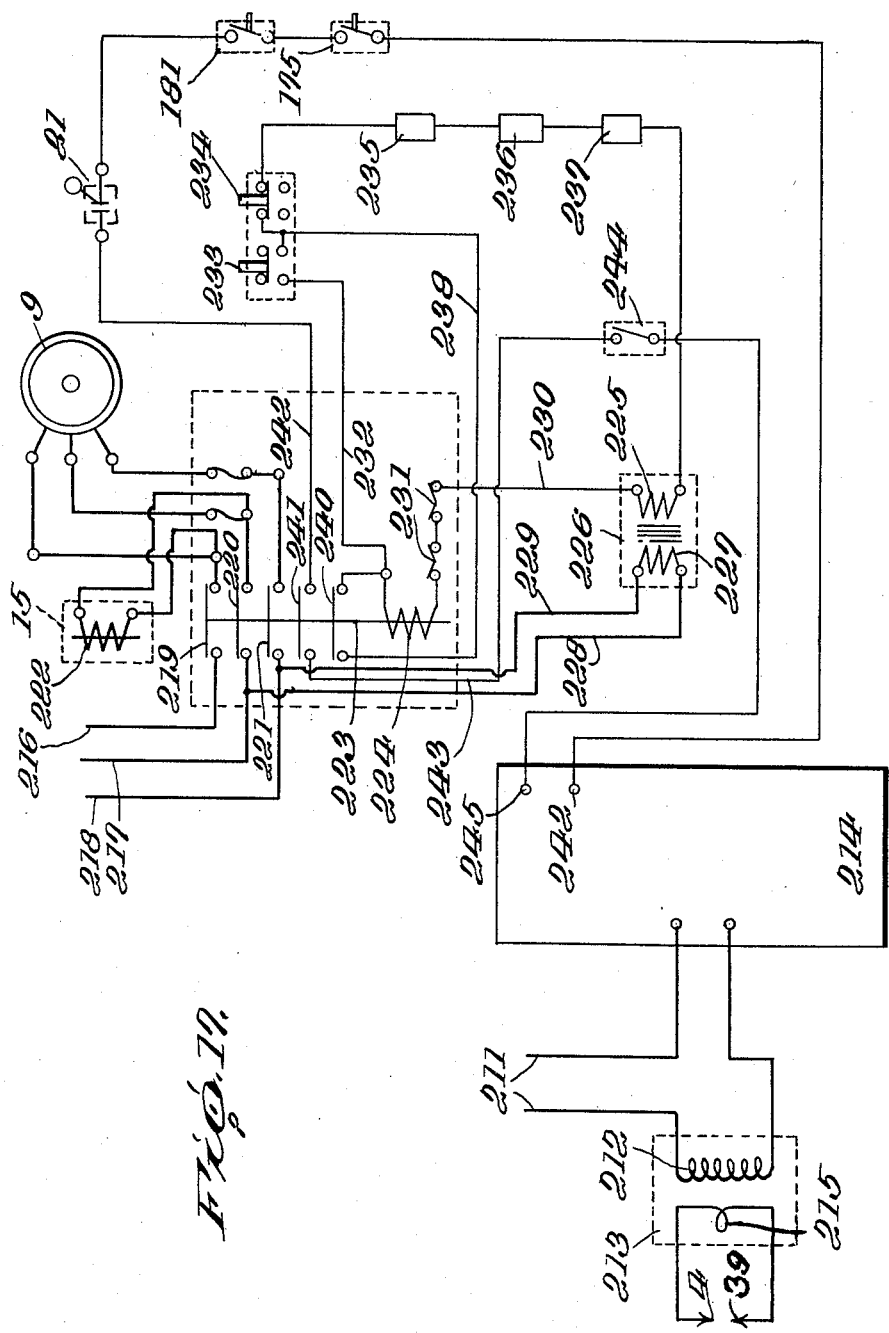

Patented Dec. 28, 1943

2,338,002

UNITED STATES PATENT OFFICE 2,338,002

MACHINE FOR WELDING KEYS TO CAN ENDS

Ralph M. Mero, Chicago, Ill., assignor to Continental Can Company, Inc., New York, N. Y., a corporation of New York Application December 18, 1942, Serial No. 469,443

25 Claims. (Cl. 219—4)

This invention relates to machines for welding keys to can ends and more particularly to machines for automatically delivering keys and can ends to a welding station, welding the keys to the can ends, and moving the welded keys and can ends away from the welding station.

An object of the invention is to provide a machine of the class referred to which is so constructed as to operate rapidly and efficiently with a minimum of possibility of damage being done to the keys and can ends, and requiring a minimum of attention by the operator in charge.

Another object of the invention is to provide a machine for welding keys to can ends in which the parts may be adjusted for operation in connection with keys of different sizes and shapes and can ends of different depths as well as different diameters.

Another object of the invention is to provide a machine of the character stated in which can ends are fed to a welding station between a pair of movable electrodes and which includes mechanism for retracting both electrodes so that neither can interfere with the feeding of the can ends to the welding station, and for moving the electrodes into welding contact with the keys and can ends only after they have been positioned at the welding station.

Another object of the invention is to provide a machine of the character referred to including novel and improved mechanism for feeding can ends from a magazine or the like to a welding station.

Another object of the invention is to provide new and improved mechanism for feeding keys from a magazine or the like and placing them on can ends, characterized in that a key feeding slide or the like is driven by means adapted to yield in the event of jamming of the feeding element, thereby avoiding damaging of the parts.

Another object of the invention is to provide a quickly demountable key magazine and associated parts for mounting it on the magazine frame.

Another object of the invention is to provide an improved mechanism for ejecting welded can ends and keys from a feeding turret.

Another object of the invention is to provide novel means for magnetically removing welded can ends and keys from an ejector and carrying them to a delivery point.

Another object of the invention is to provide a machine of the character referred to including control means for preventing completion of the welding circuit if no key is positioned at the welding station.

Another object of the invention is to provide a machine of the character referred to including control means for preventing completion of the welding circuit if no can end is positioned at the welding station.

Other objects will become apparent from a reading of the following detailed description, the appended claims, and the accompanying drawings.

In the drawings:

Figure 3 is a vertical section on the line 3—3 of Figure 2.

Figure 4 is a detail elevational view of a cam for operating a top electrode, drawn on an enlarged scale.

Figure 5 is a fragmentary sectional view on the line 3—3 of Figure 2 drawn on an enlarged scale and showing in detail the mounting of the top electrode, switches for controlling the welding circuit, and mechanism for operating the switches. The parts are shown in the positions they occupy before the top electrode is moved to welding position.

Figure 6 is a detail view partly in section and partly in elevation showing some of the parts illustrated in Figure 5 and in the positions occupied when the electrodes are in welding position.

Figure 7 is a detail horizontal section of a switch operating rod;

Figure 8 is a horizontal section of a housing and drive mechanism therein

Figure 9 is a section on the line 9—9 of Figure 8.

Figure 10 is a fragmentary elevation of a bottom electrode, a mounting therefor, and connections for conducting cooling fluid to and from the electrode.

Figure 11 is an end elevation of structure for mounting a key magazine and for operating a key slide.

Figure 12 is a detail side elevation of the key magazine mounting structure shown in Figure 11.

Figure 13 is a detail plan view of an arm for stripping welded can ends and keys from a discharge member.

Figure 14 is a top plan view of a rotatable discharge plate, a cover therefor being broken away to show the mounting of magnets for picking welded can ends and keys off the ejector mechanism.

Figure 15 is a vertical section of the parts shown in Figure 14 and showing also mechanism for operating the discharge plate.

Figure 16 is a detail fragmentary section on the line 16—16 of Figure 15.

Figure 17 is a wiring diagram.

Figure 1:
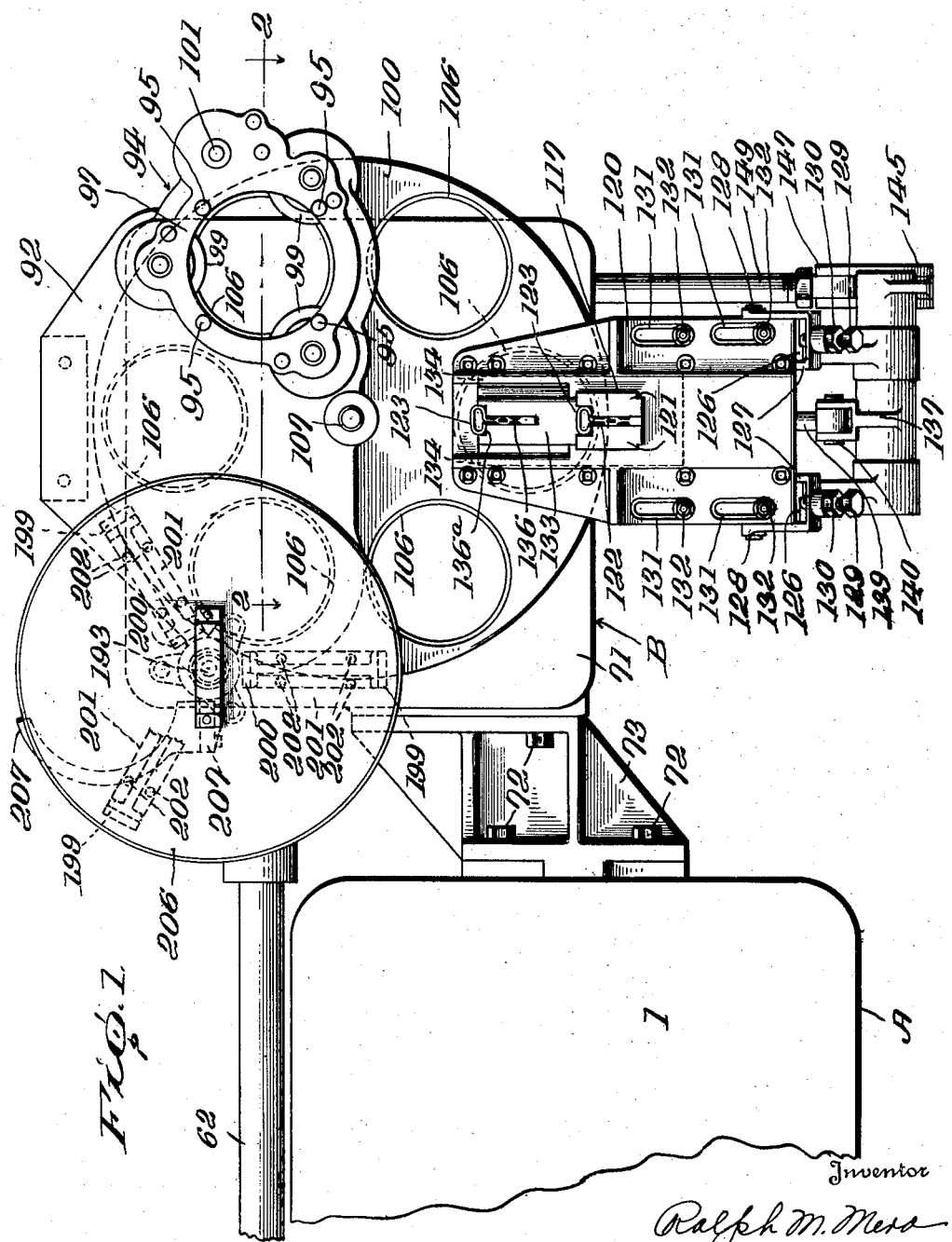
Figure 1 is a top plan view of a machine embodying the invention.

The illustrative embodiment of the invention shown in the drawings includes a basically conventional welding press A, and mechanism B mounted on and associated with the press for positioning can ends and keys at the welding station and for discharging them after the welding operation. Although the press A may be of a basically conventional type, it is equipped with mechanism for correlating its operation with the operation of the mechanism B so that the press A and mechanism B operate in combination to achieve objects and purposes of the present invention.

The press A includes a combined frame and housing 1 which supports and encloses the usual electrical equipment (not shown) for supplying the welding current. A slider 2 is mounted to reciprocate vertically in guides 3 mounted on the press frame 1 and carries a top electrode generally designated 4. The slider 2 is urged upwardly by springs 5 mounted on frame carried pins 6 and interposed between the frame 1 and a cross bar 7 carried by a bracket 8 fast to the slider 2.

Mechanism is provided for moving the slider 2 and top electrode 4 downwardly against the urge of the springs 5 and then permitting the springs to return the slider and electrode upwardly. This mechanism includes a motor 9 carried by a bracket 10 supported on the frame 1 and operatively connected by a belt 11 to a pulley 12 which drives a reduction gear unit 13 of any standard or suitable construction. The reduction gear unit 13 includes power output shaft 14 which, at its forward end (not shown), supplies the power input to a magnetically operated clutch 15 which also may be of a standard or any suitable construction. The driven shaft of the clutch 15 is indicated at 16 and is connected to a cam 17 cooperatively engaged with a follower roller 18 journaled on the bracket 8. The shaft 14 is equipped with a fan cam 19 adapted to engage a follower 20 for operating a firing control switch 21.

When the magnetically controlled clutch 15 is engaged in a manner to be described later drive will be transmitted to the shaft 16 to rotate the cam 17 and thus effect lowering and raising of the slider 2 and top electrode 4. The switch 21, closed and opened intermittently by the cam 19, controls the phase and duration of the welding operation. As will be pointed out later, other switches coact with the switch 21 and control the welding operation in such a way that no welding current can be applied unless a can end and superposed key are properly positioned at the welding station.

A bracket 22 secured to the slider 2 by screws 23 includes a vertically bored part 24 for mounting the top electrode 4. Preferably the electrode 4 is so mounted that it may yield and move upwardly relatively to the bracket 22 a small amount when it is pressed against a key and can end. In the illustrative embodiment a sleeve 25 is mounted within the bored part 24 of the bracket 22 and is provided at its lower end with a flange 26. A resilient rubber washer 27 is interposed between the flange 26 and a shim 28 which abuts the bottom of the bored part 24. The upper end of the sleeve 25 is threaded to receive nuts 29, the lower nut abutting the top of the bored part 24, and pulling the sleeve upwardly so that the flange 26 exerts a slight pressure on the resilient washer 27. The upper nut 29 acts as a lock nut. When upward pressure is applied to the sleeve 25, the washer 27 will yield so as to permit the sleeve to move upwardly with respect to the bracket 22 and slider 2.

It is desirable that the top electrode 4 be vertically adjustable with respect to its mounting on the slider 2. To this end the electrode is formed to include a holder 30 which is threaded externally to cooperate with internal threads on the sleeve 25, the arrangement being such that by turning the holder 30 it may be moved upwardly or downwardly with respect to the slider 2. A lock nut 31 on the holder 30 engages the top nut 29 for maintaining the holder 30 in adjusted position. A replaceable electrode tip 32 is removably attached to the bottom end of the holder 30.

In operation, when the slider 2 is lowered, the electrode tip 32 will engage a key, and the slider 2 and bracket 22 will then be moved downwardly a little more while the tip 32, holder 30, and sleeve 25 will remain stationary. This will be permitted by the yielding of the rubber washer 27 and the tip 32 will exert a cushioned pressure on the key.

Preferably the top electrode 4 is constructed and equipped to enable cooling fluid to pass through it. To this end the holder 30 is formed with a bore 33 and a tube 34 is extended down through the bore with sufficient clearance between the outside of the tube and the bore walls to permit the flow of cooling fluid. A fitting 35 carried by the upper end of the holder 30 is provided with inlet and outlet connections 36 and 37 adapted to place the aforesaid clearance in communication with conduits for the delivery and return of cooling fluid.

Figure 2:
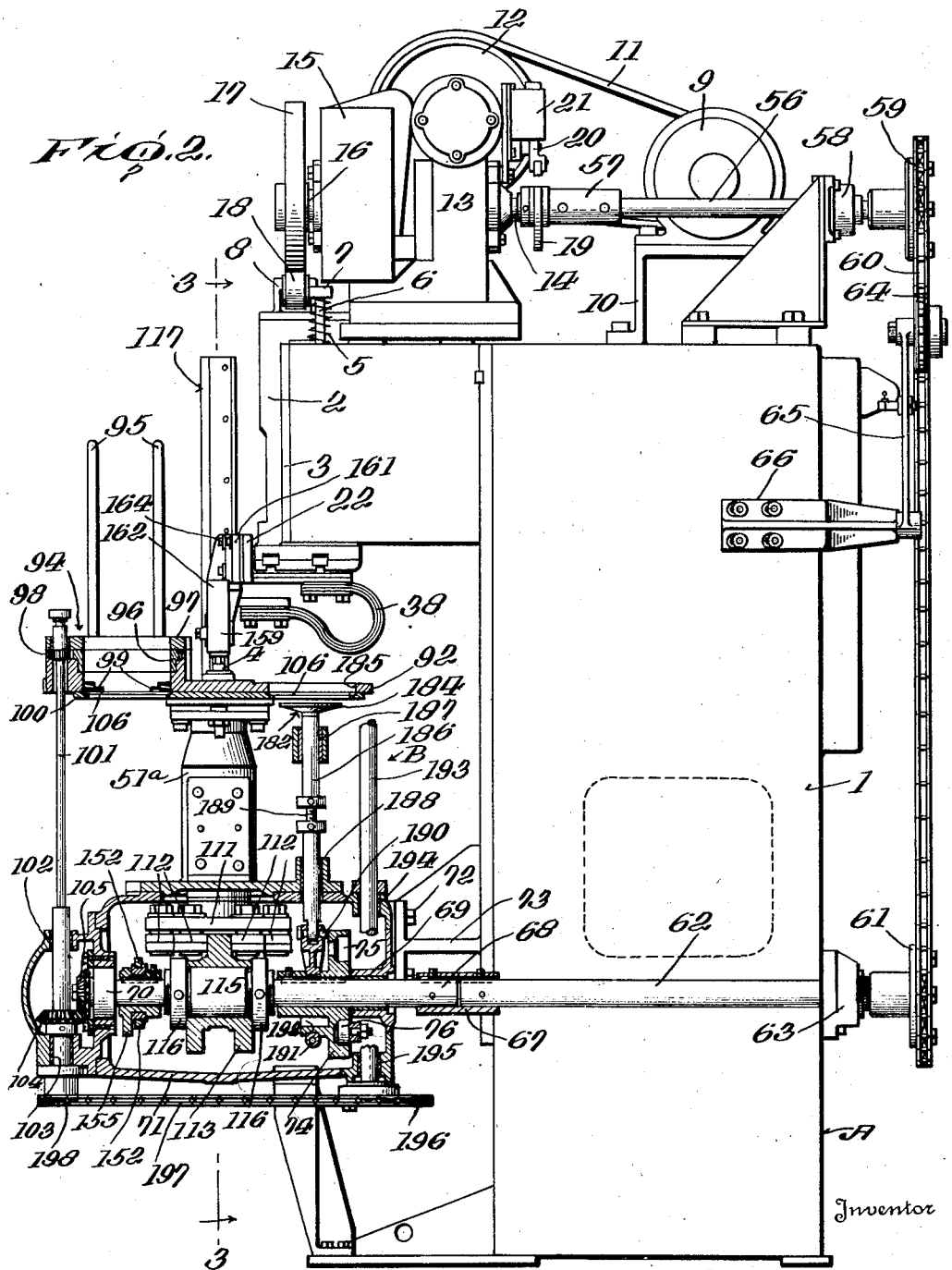
Figure 2 is a vertical section on the line 2—2 of Figure 1.

As shown in Figure 2, a flexible electrical conductor 38 is secured to the bracket 22 for connecting the top electrode 4 in the welding circuit.

A bottom electrode generally designated 39 is mounted to move towards and away from the top electrode 4 so as to permit a can end and key to be positioned between the two electrodes after which the bottom electrode is moved upwardly to make welding contact with the bottom face of the can end at or about the time the top electrode moves downwardly to contact the key. In the form shown, the bottom electrode 39 comprises a wheel or disk 40 rotatably mounted on a bracket 41 and releasably held against turning thereon by a clamping plate 42 secured to the bracket by screws 43. By loosening the screws 43 the electrode wheel 40 may be turned so as to change the contact surface.

The bracket 41 is adjustably secured to a conductor plate 44 by means of screws 45, the arrangement being such that the bottom electrode 39 can be adjusted so as to align with the top electrode 4. The conductor plate 44 is mounted on an insulating separator pad 46 in turn carried by a piston 47. As shown in Figure 10, the plate 44 is secured to the piston 47 by screws 48 which are insulated from the plate 44 by bushings 49 and washers 50. Thus there is no electrical connection between the bottom electrode 39 and the piston 47.

The piston 47 is slidable vertically in a cylinder 51 formed on a fixed bracket 51a. A key 52 prevents rotation of the piston 47 within the cylinder 51. A flexible conductor 53 shown in Figure 10 is attached to the conductor plate 44 for connecting the bottom electrode 39 in the welding circuit. The electrode bracket 41 may be jacketed for the passage of cooling fluid introduced through a pipe 54 and returned through a pipe 55.

The bottom electrode 39 is operated in timed relation with the top electrode 4. Mechanism for moving the bottom electrode includes a shaft 56 coupled as at 57 to the power output shaft 14 of the reduction gear unit 13. The shaft 56 is journaled on the frame 1 by a bearing 58 and is equipped with a sprocket 59 over which is trained a chain 60 which passes around a sprocket 61 on a shaft 62 journaled on the frame 1 as at 63. A chain tightener sprocket 64 is mounted on an arm 65 pivotally supported on a bracket 66 carried by the frame 1.

The shaft 62 is connected by a coupling 67 to a shaft 68 journaled in bearings 69 and 70 in a housing 71 connected by screws 72 to a bracket 73 on the frame 1. Keyed to the shaft 68 is a cam 74 provided with a cam groove 75 which receives a follower roller 76 mounted on the end of a lever arm 77 pivoted on the housing 71 as at 78. Fast with the lever 77 and also pivoted at 78 is a lever arm 77a to which the lower end of a link 79 is pivoted at 80. The upper end of the link 79 is pivoted at 81 to a rod 82 reciprocable in a bearing 83 carried by the bracket 51a.

The top of the rod 82 is of reduced diameter at 84 so as to provide a shoulder 85. A sleeve 86 formed with a flange 87 fits over and is rotatable upon the reduced diameter rod portion 84. The sleeve abuts against the shoulder 85 and is held against upward movement relatively to the rod 82 by a washer 88 and pin 89. External threads on the sleeve cooperate with the internally threaded bore 90 of the piston 47, the arrangement being such that the sleeve may be rotated with respect to the piston for adjusting the connection between the bottom electrode 39 and the pivot 81 whereby the limits of movement of the bottom electrode may be changed. A lock nut 91 having threaded engagement with the sleeve 86 is adapted to be drawn up against the bottom of the piston 47 for holding the sleeve in adjusted position.

In operation, the shaft 56, sprocket and chain drive 59, 60 and 61, shafts 62 and 68, and the cam 74 will be driven continuously. The cam 74 will cooperate with the roller 76 to rock the levers 77 and 77a back and forth to thereby alternately raise and lower the link 79, rod 82 and bottom electrode 39.

Means are provided for supporting a supply of can ends and keys and delivering them separately to the welding station, i. e. between the electrodes in time with the operation of the electrodes. The keys are delivered to the welding station to be superposed on the can ends at the welding station. Consequently the can ends are delivered to the welding station a little ahead of the keys.

The mechanism for supplying and delivering flanged can ends to the welding station includes a hopper plate 92 carried by a bracket 93 supported on the bracket 51a previously referred to. A can end stack feed mechanism generally designated 94, and which may be of a conventional or known construction, is mounted on the hopper plate 92. The conventional feed mechanism includes, briefly stated, stack supporting members 95, an end feed ring gear 96, a cover 97 therefor, an end feed drive gear pinion 98, and end feed screws 99 (see Figure 2). Feed screw pinions (not shown) may be included for operating the screws 99.

The feed mechanism 94 operates to feed can ends periodically from the bottom of the stack to a can end moving member or turret 100 mounted and operated as described hereinafter. The means for operating the feeding mechanism 94 includes a shaft 101 to which the pinion 98 is fixed. The shaft 101 is journaled in bearings 102 and 103 carried by the housing 71. A bevel gear 104 fixed to the lower end of the shaft 101 meshes with a bevel gear 105 fixed to the shaft 68, which is driven in the manner previously described.

The transverse turret 100 is provided with six openings surrounded by can end receiving seats 106 and is connected as at 107 to the top of a vertical shaft 108 journaled in bearings 109 and 110 carried by the bracket 51a. Fixed to the lower end of the shaft 108 is a circular plate 111 equipped with six circumferentially spaced follower rollers 112 adapted to be operated by an indexing cam 113 keyed as at 114 on an enlarged part 115 of the shaft 68 and held in place by collars 116. The indexing cam and follower construction may be of a known kind so that detail description thereof is unnecessary. Briefly stated, the operation is such that when the shaft 68 and cam 113 rotate continuously, the follower rollers 112, circular plate 111 and shaft 108 will be rotated step by step so as to move the turret 100 in steps, bringing it to rest as each seat 106 comes under the stack feed mechanism 94 and as another seat previously supplied with a can end arrives at the welding station.

The means for supplying and delivering individual keys on top of the can ends at the welding station includes a key stack magazine generally designated 117 mounted on a bracket 118 fixed to the housing 71 by screws 119. The key stack magazine 117 includes a base 120 and two spaced upright members 121 whose contiguous faces are shaped to define conjointly a slot 122 for receiving the stems of keys 123.

It is desirable that the magazine 117 be adjustable horizontally and that it be adapted to be removed easily so as to permit replacement by a magazine adapted to hold keys of a different size or shape. The bracket 118 is formed with seats 124 having overhanging inner ends 125. Rails 126 are removably positioned on the flat surfaces of the seats 124 with their inner ends projecting under the overhanging portions 125 of the bracket 118. For releasably holding the rails on their seats, yokes 127 pivoted as at 128 on the bracket 118 are provided with holding screws 129 adapted to be turned up against the outer ends of the rails 126. Lock nuts 130 are provided for maintaining the screws 129 in their rail-holding positions.

The base 120 is provided with slots 131 which receive screws 132 having threaded engagement with the rails 126. By loosening the screws 132, the magazine 117 may be shifted horizontally and the screws then tightened to secure the magazine in adjusted position.

If it should be desired to remove the entire magazine 117, the yoke screws 129 may be loosened and the yokes then swung downwardly so as to permit the rails 126 and the magazine 117 supported thereon to be slid outwardly and removed.

A key transfer member or slider 133 is mounted to reciprocate under the stack of keys 123 for receiving keys and delivering them to the welding station. The key transfer member 133 is formed with tongues 134 slidable in grooves 135 in the key stack base 120. The top surface of the slider is formed with a key engaging seat part 136 for receiving the stems of the keys 123 and the end of the slider which moves toward the welding station is cut out from top to bottom as indicated at 136a (see Figure 1). Thus no part of the slider extends above or below the elliptical handle of a key 123 positioned on the seat 136.

The slider 133 is reciprocated by mechanism including a lever 137 secured to a rock shaft 138 journaled on the bracket 118. The lever 137 is connected to the slider 133 by an adjustable turnbuckle link 139 pivoted as at 140 to the lever 137 and pivoted as at 141 to the slider 133. A spring 142 connected to the lever 137 and the bracket 118 as at 143 and 144 respectively urges the lever 137 to move the slider 133 from under the key stack and toward the welding station.

A lever 145 fast on the rock shaft 138 has its lower end connected as at 146 to a link 147 which is in turn connected as at 148 to a rod 149 slidable in a bearing 149a in the housing 71. The rod 149 is threaded to receive a yoke 150 held against turning on the rod by a lock nut 151. The yoke 150 includes guide arms 152 slidably receiving bearing blocks 153 the inner surfaces of which are of arcuate formation to fit the hub 154 of a cam 155 keyed as at 156 to the shaft 68, the hub 154 being concentric with respect to the shaft 68. The end or cross piece 157 of the yoke is equipped with a follower roller 158 which engages the periphery of the cam 155.

In operation, rotation of the cam 155 will act on the follower roller 158 to pull the rod 149 toward the right as viewed in Figure 3 to thus rock the levers 145 and 137 counter-clockwise against the urge of the spring 142. The lever 137 will pull on the link 139 to move the slider 133 away from the welding station and position the slider groove 136 under the key stack to receive a key. Upon continued rotation of the cam 155 the follower roller 158 will be permitted to move inwardly and the spring 142 will rock the lever 137 clockwise as viewed in Figure 3 so as to move the slider 133 and key supported thereon to the welding station.

The yieldable spring 142 drives the key slide 133 impositively so that if the slide should be jammed by a misplaced key or otherwise, it will stop and breakage or damaging of the key-feeding mechanism will be averted.

Means are provided for stripping the keys from the slider 133 and depositing them upon the can ends preparatory to welding and also for preventing completion of the welding circuit if either a can end or a key is not properly positioned at the welding station. Mechanism for accomplishing these purposes is shown in Figures 2, 3, 5, and 6. A plate 159 is mounted on but is electrically insulated from the bracket 22. Slots 160 in the plate 159 receive screws 161 threaded into the bracket 22. The slots 160 extend vertically so that by loosening the screws 161 the plate 159 may be adjusted vertically and then locked in adjusted position by tightening of the screws. A bracket 162 formed with horizontal slots 163 is mounted on the plate 159 and is secured in horizontally adjusted position by screws 164. Thus it is possible to adjust the bracket 162 both horizontally and vertically with respect to the bracket 22.

The bracket 162 is formed with a cylinder 165 which receives a vertically reciprocable piston 166. The piston is formed with a slot or groove 167 into which is extended a screw 168 anchored in the cylinder 165. The screw 168 and slot 167 hold the piston against turning in the cylinder and limit the downward movement of the piston under the urge of a spring 169 interposed between the top end of the cylinder and the adjacent end of the piston.

A rod 170 mounted to reciprocate vertically with respect to both the cylinder and the piston 166 has its lower part 171 formed of elliptical cross section to fit snugly within the elliptically looped ends of the keys 123. The upper part 172 of the rod 170 is round and extends through the top of the cylinder 165. The shoulder formed at the junction of the elliptical rod part 171 and round rod part 172 serves as a seat for the lower end of a spring 173, the upper end of which abuts the top of the cylinder 165. The spring 173 urges the rod 170 downwardly, but downward movement of the rod is limited by engagement of a rod carried pin 174 with the top of the cylinder 165.

In operation, when the turret 100 has delivered a can end C to the welding station and the slider 133 has moved a key 123 to the welding station, the parts will be in the relative positions shown in Figure 5 before the electrodes 4 and 39 are moved downwardly and upwardly respectively. When the slider 2 moves downwardly, the electrode 4 and cylinder 165 will be lowered until the lower end 171 of the rod 170 passes through the looped end of the key 123 and then engages the can end C. This will occur before the electrode 4 engages the key 123, and the slider 133 will be withdrawn before the electrode 4 arrives at welding position. When the slider 133 is withdrawn, the key 123 will be held by the rod 170. During further downward movement of the slider 2, the electrode 4 and the cylinder 165 will continue to move downwardly, but the key-retaining member 170 will remain stationary as is permitted by yielding of the spring 173. The electrode 4 will engage the key stem and push the key off the rod 170 onto the can end C. Finally the electrode 4 will press the key against the can end C which by this time will be supported by the bottom electrode 39 which has been moved up under the can end. The parts will then be in readiness for passage of the welding current.

It is desirable that the welding circuit should not be completed if a can end is not positioned at the welding station. Means for controlling the completion of the welding circuit depending upon the positioning of a can end at the welding station, includes a switch 175 mounted on the bracket 162 and having an operating button 176 adapted to be engaged and depressed by a cam collar 177 held in adjusted position on the rod 170 by a lock nut 178. In operation, when the switch operating rod device 170 engages a can end C and thereby is moved upwardly relatively to the cylinder 165 and switch 175, the collar 177 will operate the switch button 176 so as to enable the closing of the welding circuit. On the other hand, if no can end is positioned at the welding station when the slider 2 is moved downwardly, the rod 170 will merely continue to move downwardly together with the bracket 162 and switch 175 so that the switch button 176 will not be operated and the welding circuit will not be set up or conditioned for operation. The rod 170 thus constitutes a detector responsive to contact with a can end in welding position for operating the switch 175.

Likewise, it is desirable that completion of the welding circuit be prevented if no key is positioned at the welding station when the electrodes are moved to welding position. To this end, a cam lug 179 is mounted on the piston 166 and is adapted to engage and depress the operating button 180 of a switch 181 carried by the bracket 162 only when the piston 166 is moved upwardly within the cylinder 165. Normally, that is when a key is positioned on top of a can end C as shown in Figure 6, the lower end of the piston 166 will engage the key just before the slider 2 completes its downward movement. After the switch operating piston device 166 engages the key, and during the final downward movement of the slider 2, the piston 166 will move upwardly relatively to the cylinder 165 and switch 181, thereby causing the cam lug 179 to engage and depress the operating button 180 of the switch. This will enable the completion of the welding circuit.

However, should no key 123 be positioned at the welding station when the slider 2 and parts carried thereby are moved downwardly, the slider 2 will reach the end of its downward movement before the piston 166 can engage the can end C so that the piston will not move up relatively to the switch 181. Consequently the switch button 180 will not be depressed and the welding circuit will not be set up or conditioned to be closed. Thus, the piston 166 constitutes a detector responsive to contact with a key in welding position for operating the switch 181.

It will be observed that in order to condition the welding circuit to be closed, both the switches 175 and 181 must be operated and consequently it will be necessary for a can end C and the superposed key 123 to be positioned at the welding station.

When a can end and key are properly positioned at the welding station and the electrodes have been moved into contact with the can end and key as shown in Figure 6, the switch 21 will be operated to finally close and then open the welding circuit.

After a key has been spot welded to a can end, the turret 100 is advanced to move the welded can end and key to a discharge station, at which an ejector generally designated 182 lifts the can end and key from the turret to be picked up by a rotating discharge plate member 183.

The ejector mechanism 182 includes a pad 184 positioned below an opening 185 in the hopper plate 92. The pad 184 is carried on the upper end of a rod 186 reciprocable in fixed bearings 187 and 188. Preferably the rod 186 is adjustable as to length as at 189. The lower end of the rod 186 is connected as at 190 to an eccentric strap 191 cooperable with an eccentric 192 fast with the cam 74, which is secured to the shaft 68.

In operation, the continuously rotating eccentric 192 will reciprocate the rod 186 to project the pad 184 up through the seats 106 in the turret 100 as the seats arrive respectively over the pad 184. Thus, as each welded can end and key arrive at the discharge station, the pad 184 will lift them off the turret 100 and position them close to the bottom of the discharge plate 183.

The discharge plate 183 is splined to the upper end of a shaft 193 journaled in bearings 194 and 195 carried by the housing 71. The shaft 193 is continuously rotated by a sprocket 196 secured to the lower end of the shaft 193, a chain 197 engaging the sprocket 196, and a sprocket 198 secured to the lower end of the shaft 101. The discharge plate 183 is provided with three circumferentially spaced pairs of outer and inner horse shoe magnets 199 and 200 respectively. The magnets are mounted against the ends of radially disposed bars 201 secured to the plate 183 by screws 202. Adjacent each end of the bars 201 are openings 203 extending through the discharge plate 183. Blocks 204 fitting within the magnets 199—200 are secured to the ends of the bars 201 for holding the magnets on the plate 183. The plate 183, bars 201, and blocks 204 are formed of non-magnetic material. A cover 206 may be friction fitted over the plate 183 for preventing dirt from accumulating on the discharge plate 183 and associated parts.

In operation, as each welded can end and key come to rest at the discharge station, the pad 184 will lift the can end and key from the turret seat 106 and move them up under the continuously rotating discharge plate 183. When a pair of magnets 199—200 moves over the welded can end and key, they will be attracted and held against the discharge plate 183 and moved from the discharge station.

For stripping the welded can ends and keys from the discharge plate 183, an arcuate stripper bar 207 is mounted on the hopper plate 92 at a delivery station just below the discharge plate 183. As each can end and key move up to the stripper bar 207, they will be intercepted and held stationary while the discharge plate 183 continues to rotate. The magnets 199—200 will move from above the intercepted can end and key, whereupon the latter will drop downwardly into a receptacle or onto a conveyor (not shown). In order to permit adjustment of the stripper bar for adapting it to intercept can ends of different sizes, it is mounted on a bracket 208 pivoted on the shaft 193. The bracket 208 is formed with an arcuate slot 209 which receives a screw 210 having threaded connection with the hopper plate 92. When the screw 210 is loosened, the bracket 208 and stripper bar 207 may be adjusted on the shaft 193. The screw 210 may then be tightened to lock the stripper bar in adjusted position.

*Welding and control circuits*

Figure 17 shows a preferred wiring circuit for supplying and controlling the supply of current to the electrodes 4 and 39 and for controlling the operation of the motor 9 and parts operated by it. A 440 volt power line 211 is connected to the primary winding 212 of a welding transformer 213 through a welding control panel equipment 214. The transformer 213 may be mounted within the press housing 1 and has opposite ends of its secondary winding 215 connected to the electrodes 4 and 39. When a circuit is made through the primary winding 212, the welding potential will be established at the electrodes 4 and 39.

A control circuit is provided for governing the energizing of the primary winding 212, the engaging of the clutch 15, and the operation of the motor 9. Control circuit supply conductors 216, 217 and 218 lead to the motor 9 through contactors 219, 220 and 221 respectively. Conductors 216 and 217 lead to a solenoid winding 222 through the contactors 219 and 220, the solenoid winding 222 being adapted, when energized, to effect engaging of the clutch 15.

The contactors 219, 220 and 221 are normally open and are carried by a solenoid plunger 223 adapted to be moved to contactor closing position when a solenoid winding 224 is energized. The solenoid winding 224 is adapted to be energized by current from the secondary winding 225 of a transformer 226, the primary winding 227 of which is connected to the conductors 217 and 218 by means of conductors 228 and 229. A conductor 230 leads from one end of the secondary winding 225 through overload devices 231 to the solenoid winding 224, the latter in turn leading through a conductor 232 to a start switch 233, thence through a stop switch 234, and thence in series through a shear pin control 235, a cover stack control 236, and a key stack control 237, back to the secondary winding 225.

The conductor 232, another conductor 238, and a contactor 240 carried by the plunger 223 are connected across the start switch 233 to provide a holding circuit. Once the start switch 233 is closed, the solenoid winding 224 will remain energized and the motor 9 will continue to run until the stop switch 234 is opened or the control circuit broken at one of the switches 235, 236, 237.

The solenoid plunger 223 also carries a contactor 241 closing of which is effective upon the welding control panel equipment 214 for energizing the primary winding 212 of the transformer 213. A conductor 242 leads from the contactor 241 through the firing control switch 21, the "no key-no weld" switch 181, and the "no cover-no weld" switch 175 and thence to a terminal 242 on the panel 214. Another conductor 243 leads from the contactor 241 through a thermostatic switch 244 to another terminal 245 on the panel 214. The switch 244 is adapted to open automatically in response to higher-than-normal temperature of water cooling the transformer 213 and the electrodes.

In operation, the start switch 233 is closed momentarily to energize the solenoid winding 224 and thereby close all the contactors 219, 220, 221, 240 and 241. The motor 9 will thereby be started, the clutch 15 will be engaged, and the circuit for holding the contactors closed will be established. The holding circuit will be opened upon manual operation of the stop switch 234 or automatic operation of any of the control switches 235, 236, 237. When the holding circuit is opened all of the contact bars 219, 220, 221, 240 and 241 are moved out of engagement with their respective contact points, so that even if the momentum or coasting of the motor 9 causes the firing switch 21 to be closed, the welding circuit will not be completed because the contact bar 241 will be out of contact with its contact points.

*Operation*

To prepare the machine for operation, a supply of can ends C is placed in the stack magazine 94, a supply of keys is placed in the key stack magazine 117, the motor 9 is started, and the clutch 15 is engaged.

The shaft 68, the cam 74, the eccentric 192, the indexing cam 113, the cam 155, and the stack feed pinion 98 will all be rotated continuously. Rotation of the indexing cam 113 will effect a step by step rotation of the turret 100 to transfer can ends fed from the magazine 94 to the welding station between the electrodes 4 and 39. The key slide 133 will be reciprocated and so timed with respect to the starting and stopping of the turret 100 as to deliver a key 123 from the key stack magazine 117 to the welding station just after a can end C is delivered to the welding station. Meanwhile the cam 17 is rotated to move the slider 2 and parts carried thereby downwardly. When the lower end of the rod 170 extends through the handle of a key 123 and comes to rest against the can end C, the rod 170 will move upwardly with respect to the switch 175 so as to operate the button 176 in the manner previously explained and thereby to condition the welding circuit for being completed. The key slide 133 will then be withdrawn whereupon the piston 166 will push the key down against the can end C. During further downward movement of the slider 2, the piston 166 will be raised so as to operate the switch button 180 and further condition the welding circuit for being closed. After the top electrode 4 engages the key and the bottom electrode 39 engages the bottom of the can end C, the switch 21 will be closed by operation of the cam 19 to complete the closing of the welding circuit and maintain it closed for the desired period.

If no can end is presented at the welding station, the switch 175 will not be operated to condition the welding circuit for being closed and if no key 123 is presented at the welding circuit, the switch 181 will not be operated to condition the welding circuit for being closed.

After the welding current has been cut off, the cam 17 will move on around to permit the springs 5 to lift the slider 2, thereby raising the top electrode 4. Similarly the bottom electrode 39 will be lowered by the cam 74 and associated mechanism.

When the electrodes have moved away from the welded can end and key, the turret 100 will move the can end and key to the discharge station, where the can end will be engaged by the lifting pad 184 and moved up sufficiently close to the discharge plate 183 to be attracted and held by a pair of magnets 199—200. The welded can end and key will then be moved around with the discharge plate 183 until wiped off by the stripper bar 207 and dropped into a receptacle or onto a conveyor.

*Adjustments*

The machine disclosed herein may be adjusted or adapted for welding keys on or off the centers of the can ends, for welding keys of different lengths to can ends, and for welding keys to can ends having different depths as well as different diameters.

To adapt or adjust the machine for operation in connection with can ends of different diameters, the turret 100 may be removed from the shaft 108 and replaced with a turret having seats larger or smaller in diameter than the seats 106.

To adapt or adjust the machine for welding keys to flanged can ends of different depths, the range of movement of the electrodes 4 and 39 may be adjusted so as to bring them into contact with the keys and the body of the can end respectively when the electrodes reach the limits of their travel toward welding position. The range of movement of the top electrode 4 may be varied by loosening the lock nut 31, turning the holder 30 within the sleeve 25 and then retightening the lock nut 31. The range of movement of the bottom electrode may be varied by loosening the lock collar 91 and rotating the sleeve 86 within the piston 47. The height of ejector pad 184 is adjusted in accordance with the depth of the can end flange by adjusting the rod 186 at 189.

The position at which the keys are welded on the can ends, i. e. on center or off center of the can ends is determined by the horizontal or lateral adjustment of the electrodes 4 and 39. The top electrode 4 may be adjusted laterally by loosening the screws 23 and shifting the bracket 22 horizontally. This adjustment of the bracket will also effect horizontal shifting or adjusting of the key retaining rod 170, the switches 175 and 181 and the mechanism for operating the switches in response to approach of the top electrode 4 to a properly positioned key and can end.

For conditioning the mechanism to feed and weld keys of different lengths and also for forming the weld at the desired points on the keys, the range of movement of the key slide 133 may be adjusted by means of the turn-buckle 139. It will be apparent that by rotating the turn-buckle the slide 133 may be caused to reach its extreme position at the end of a feeding stroke when the looped end of the key is positioned directly under the rod 170.

The mechanism disclosed herein embodies the invention in the form now preferred, but it will be understood that changes may be made without departing from the invention as defined in the claims.

I claim:

1. In a machine for welding keys to flanged can ends of varying depths, a pair of electrodes; means mounting both said electrodes to move towards and from each other; means engageable by the flange only of a can end for supporting said can end and a key thereon between said electrodes, the position of the contacting portions of the can end and key along the line of movement of said electrodes being variable in dependence upon the depth of the can end flange; means for first moving both said electrodes toward each other for bringing them respectively into contact with the key and the face of the can end opposite said key, and for then moving both electrodes away from each other and respectively away from said key and said can end; and means for adjusting both said electrodes longitudinally of their line of movement whereby the limits of their movements towards each other can be varied to bring about welding contact with keys and can ends of different depths.

2. In a machine for welding looped end keys to can ends, a key stack magazine; means for supporting individual can covers; and means for withdrawing individual keys from the bottom of the stack and depositing them upon supported individual can covers including a key transfer member formed with a key receiving seat: means for operating said key transfer member to move said seat first under said magazine to receive a key, then over a can cover on said supporting means, and then back under said magazine, means mounted for movement for being projected into the key looped end when the key is over the can cover and thus holding the key against movement with said seat back to said magazine; and means for operating said movably mounted means in timed relation to operation of said key transfer member.

3. In a machine for welding looped end keys to can ends, a key stack magazine; means for supporting individual can covers; and means for withdrawing individual keys from the bottom of the stack and depositing them upon supported individual can covers including a key transfer member formed with a key receiving seat; means for operating said key transfer member to move said seat first under said magazine to receive a key, then over a can cover on said supporting means, and then back under said magazine, means mounted for movement for being projected into the key looped end when the key is over the can cover and thus holding the key against movement with said seat back to said magazine; means for operating said movably mounted means in timed relation to operation of said key transfer member, and means for stripping said key from the means projected through the key looped end after said seat has moved away from said can end.

4. In a machine for welding keys to can ends, a key stack magazine; means for supporting individual can covers; and means for withdrawing individual keys from the bottom of the stack and depositing them upon supported individual can covers including a key transfer member having a key engaging part; means for operating said key transfer member to move said key engaging part first under said magazine to engage a key, then over a can cover on said supporting means, and then back under said magazine, means for varying the range of movement of said key transfer member with reference to said can end supporting means to thereby condition said key transfer member to deliver keys to desired positions centered or off center with respect to supported can ends, and means mounting said magazine for adjustments to correlate it with said key transfer member according to the selected range of movement of said key transfer member.

5. In a machine for welding keys to can ends, a structure as set forth in claim 4 and which includes electrode means movable into contact with a supported can end and key thereon, and means mounting said electrode means for adjustments conforming to the adjustments of the magazine and the range of movement of the key transfer member.

6. In a machine for welding keys to can ends, a frame formed with a rail seat; a rail removably positioned on said seat; releasable holding means for retaining said rail on said seat; a key stack magazine having a slotted base supported on said rail; and screw means extending through a slot in said base and having threaded connection with said rail, said screw and slot providing for small adjustments of said magazine on said frame, said magazine being bodily removable from said frame together with said rail upon releasing of said holding means.

7. In a machine for securing keys to can ends, a frame; a seat thereon comprising a flat surface and an overhanging portion at one end thereof; a key magazine having a rail on its bottom adapted to rest on said seat, said rail having one end portion adapted to extend under the overhanging seat end portion; and means for releasably maintaining said rail on said seat comprising a yoke, means pivotally connecting the yoke to the frame, and a holding screw having threaded connection to said yoke and being adapted to be drawn up against said rail to force it against said seat flat surface and overhanging end portion.

8. In a machine for welding keys to can ends, means for supporting a can end and key in position to be welded, electrode means contactible with a supported can end and key respectively; a switch operable for enabling a welding circuit to be closed through said electrode means and said can end and key; a detector responsive to contact with a can end in welding position for operating said switch; and means for effecting relative movement between said detector and said can end to bring said detector relatively into contact with said can end.

9. In a machine for welding keys to can ends, means for supporting a can end and key in position to be welded, electrode means contactible with a supported can end and key respectively; a switch operable for enabling a welding circuit to be closed through said electrode means and said can end and key; a detector responsive to contact with a key in welding position for operating said switch; and means for effecting relative movement between said detector and said key to bring said detector relatively into contact with said key.

10. In a machine for welding keys to can ends, means for supporting a can end and key in position to be welded, electrode means contactible with a supported can end and key respectively; two switches operable for enabling a welding circuit to be closed through said electrode means and said can end and key; a detector responsive to contact with a can end in welding position for operating one of said switches; a detector responsive to contact with a key in welding position for operating the other of said switches; and means for effecting relative movement between said detectors and said can end and key respectively to bring said detectors relatively into contact with said can end and key respectively.

11. In a machine for welding keys to can ends, means for supporting a can end and a key in position to be welded; an electrode engageable with the can end on the side thereof opposite said key; a movable electrode engageable with said key; means for moving said movable electrode towards and from said key; a switch operable for enabling a welding circuit to be closed through said electrodes and said can end and key; means mounting said switch to move together with said movable electrode; a switch operating device normally inactively positioned with respect to said switch; and means yieldably mounting said device to move together with said movable electrode and said switch toward said can end until said device engages said can end, the yieldable mounting of said device then permitting it to be held stationary by said can end while said electrode and switch continue to move, and the resultant relative movement of said device and said switch bringing about operation of said switch by said device.

12. In a machine for welding keys to can ends, means for supporting a can end and a key in position to be welded; an electrode engageable with the can end on the side thereof opposite said key; a movable electrode engageable with said key; means for moving said movable electrode towards and from said key; a switch operable for enabling a welding circuit to be closed through said electrodes and said can end and key; means mounting said switch to move together with said movable electrode; a switch operating device normally inactively positioned with respect to said switch; and means yieldably mounting said device to move together with said movable electrode and said switch toward said key until said device engages said key, the yieldable mounting of said device then permitting it to be held stationary by said key while said electrode and switch continue to move, and the resultant relative movement of said device and said switch bringing about operation of said switch by said device.

13. In a machine for welding looped end keys to can ends, means for supporting a can end in position to be welded; a slide for carrying a key over a can end when the latter is in position to be welded, said slide being constructed to engage the key with no part of the slide closing the opening in the key looped end; means for operating said slide to move a key engaged thereby into welding position and for then moving the key-engaging part away from the welding position; an electrode engageable with said can end on the side thereof opposite a key in welding position; a movable electrode engageable with said key; a switch operable for enabling a welding circuit to be closed through said electrodes and said can end and key; a rod; means mounting said rod for endwise movement into the looped end of said key; means for moving said movable electrode; said switch, and said rod together toward said can end and key including yieldable means for permitting the rod to come to rest when it projects through said key looped end and engages said can end and to remain stationary during continued movement of said movable electrode and switch, thereby bringing about relative movement of said rod and switch; and means responsive to relative movement of said rod and switch for operating said switch, the means for operating said slide being timed to feed the key to welding position before said rod has moved to engagement with said can end and to move the key engaging slide part away from the welding position while said rod is projected through said key looped end.

14. In a machine for welding looped end keys to can ends, means for supporting a can end in position to be welded; a slide for carrying a key over a can end when the latter is in position to be welded, said slide being constructed to engage the key with no part of the slide closing the opening in the key looped end; means for operating said slide to move a key engaged thereby into welding position and for then moving the key-engaging part away from the welding position; an electrode engageable with said can end on the side thereof opposite a key in welding position; a support movable towards and from a key in welding position; an electrode mounted on said support; a cylinder mounted on said support; two switches mounted on said support, operation of both of said switches being required for enabling a welding circuit to be completed through said electrodes, said can end and said key; a piston reciprocable in said cylinder towards and from said can end and key; a spring for urging said piston to move in said cylinder towards said key; means operable by movement of said piston in said cylinder for operating one of said switches, a rod reciprocable axially in said cylinder and piston; a spring for urging said rod to move axially of said piston and cylinder through the looped end of said key; means operable by movement of said rod axially of said piston and cylinder for operating the other of said switches; and means for moving said support towards said can end and key for projecting said rod through said key looped end into contact with the can end, for then continuing to move said movable electrode and said cylinder and piston while the rod remains stationary whereby the piston will push the key along the rod and against the can end, and for then continuing to move said movable electrode while said rod and said piston are stationary until said movable electrode makes welding contact with said key.

15. In a machine for welding keys to can ends, a pair of spaced electrodes; means for supporting a can end and key between said electrodes; means for moving at least one of said electrodes toward the other to bring about welding contact between said electrodes and said can end and key respectively; means for establishing a welding circuit through said electrodes, said can end and said key including switch means normally preventing establishing of the welding circuit; and detector means exclusive of the electrodes mounted out of the path of movement of the movable electrode and being operable in response to movement of said movable electrode towards both a can end and key positioned between said electrodes for actuating said switch means to thereby establish the welding circuit.

16. In a machine for welding keys to can ends, means including electrode means for passing a welding current through a contacting key and can end; a moving discharge member; magnetic means on said discharge member; and ejector means for moving a welded can end and key sufficiently close to said discharge member to be attracted by said magnetic means to be held on said discharge member and moved thereby to a delivery station.

17. In a machine for welding keys to can ends, means including electrode means for passing a welding current through a contacting key and can end; a feeding member formed with a seat for supporting a welded can end and key; means for moving said member over a predetermined path to move a supported welded can end and key away from said electrode means; a discharge member; magnetic means on said discharge member; means mounting the discharge member to move adjacent the path of the feeding member but not sufficiently close thereto for the magnetic means to effectively attract a can end and key and move them off said feeding member; and ejector means for displacing a can end and key from said seat and moving them sufficiently close to said seat to be effectively attracted by said magnetic means and held thereby on said discharge member for movement to a delivery station.

18. In a machine for welding keys to can ends, means including electrode means for passing a welding current through a contacting key and can end; a feeding member for supporting a welded can end and key; means for moving said member over a predetermined path to move a supported welded can end and key away from said electrode means; and means for displacing the welded can end and key from said feeding member and moving them to a delivery point including a discharge member, magnetic means on said discharge member, and means mounting the d'scharge member to move adjacent the path of the feeding member.

19. In a machine for welding keys to can ends, means including electrode means for passing a welding current through a contacting key and can end; a feeding member for supporting a welded can end and key; means for moving said member over a predetermined path to move a supported welded can end and key away from said electrode means; means for displacing the welded can end and key from said feeding member and moving them to a delivery point including a discharge member, magnetic means on said discharge member, and means mounting the discharge member to move adjacent the path of the feeding member; and means disposed in the path of a welded can end and key being moved by said discharge member for intercepting the can end and key and holding them against movement with said discharge member, thereby effecting movement of said magnetic means relative to said can end and key and consequent detaching of said can end and key from said discharge member.

20. In a machine for welding keys to can ends, a turret formed with a seat for supporting a can end and with an opening surrounded by said seat; electrode means mounted to be engageable with a can end and key supported on said seat when the turret is in one position; an ejector; means mounting said ejector to move through said opening to displace a welded can end and key from said seat when the turret is in another position; and means operating said turret and said ejector in timed relationship to move said turret from said one position to said other position and to then move said ejector through said opening to displace the can end and key from said seat.

21. In a machine for welding keys to can ends, a turret formed with a seat for supporting a can end and with an opening surrounded by said seat; electrode means mounted to be engageable with a can end and key supported on said seat when the turret is in one position; an ejector; means mounting said ejector to move through said opening to displace a welded can end and key from said seat when the turret is in another position; means operating said turret and said ejector in timed relationship to move said turret from said one position to said other position and to then move said ejector through said opening to displace the can end and key from said seat; a discharge member; means mounting said discharge member to move adjacent said seat when said turret is in said other position; a magnet on said discharge member for attracting and holding on said discharge member a can end and key displaced from said seat by said ejector; and means for effecting displacement of said can end and key from said discharge member.

22. In a machine for welding keys to can ends, a rotatable turret formed with a seat for supporting a can end and with an opening surrounded by said seat; electrode means mounted to be engageable with a can end and key supported on said seat when the turret is in one position; a reciprocable ejector mounted to move through said opening to displace a welded can end and key from said seat when the turret is in another position; means for rotating said turret intermittently to place said seat successively in said one position and then in said other position; means cooperable with said electrode means for welding a seat-supported can end and key when said seat is in said one position; means for operating said ejector when said seat is in said other position for displacing a welded can end and key from said seat; a rotatable discharge plate; a magnet carried by said discharge plate; means mounting said discharge plate to move said magnet sufficiently close to a can end and key displaced from said seat by said ejector for attracting and holding said can end and key; and means for stripping said can end and key from said magnet at a delivery point removed from said ejector.

23. In mechanism for feeding and delivering can ends, a feeding member formed with a seat for supporting a can end and with an opening surrounded by said seat; means for moving said feeding member intermittently to feed a can end supported on said seat to different positions; an ejector, means for moving said ejector through said opening when said feeding member is in a predetermined position to displace a can end from said seat; a rotatable discharge plate; a plurality of circumferentially spaced magnets on said discharge plate; means mounting said discharge plate to move said magnets sufficiently close to a can end displaced from said seat by said ejector to enable one of said magnets to attract and hold said can end; and a stripper bar positioned to be engaged by the can end while the latter is being moved by said discharge plate and magnet to hold the can end against movement until the holding magnet has moved away from said can end and the latter is thus released from said discharge plate.

24. In a machine for welding looped end keys to can ends, electrode means; means for supporting a can end in welding position adjacent said electrode means; a key feeding member; means for moving said member intermittently to feed a key to welding position between said electrode means and said can end and then move the key feeding part of said member away from the welding position; a key retaining member; means mounting said key retaining member normally out of the path of feeding of the key; and means for operating said key feeding member and said key retaining member in timed relationship to feed a key to welding position, to then project said key retaining member into the key looped end, and to then move the key feeding part of said key feeding member away from the welding position while the key is held against accompanying the key feeding member.

25. In a machine for welding keys to can ends, electrode means; means for positioning can ends to be engaged by the electrode means; and means for positioning keys on can ends to also be engaged by said electrode means, comprising a key magazine, a reciprocable key feeding element for moving keys from the magazine and delivering them to the can ends, a spring urging said key feeding element to move from said magazine to the point of key delivery, and means periodically operable against the urge of said spring for returning said key feeding element to said magazine.

RALPH M. MERO.